July 23, 1940.   D. S. BOND   2,208,623
ELECTROMECHANICAL SERVO DEVICE
Filed March 31, 1939
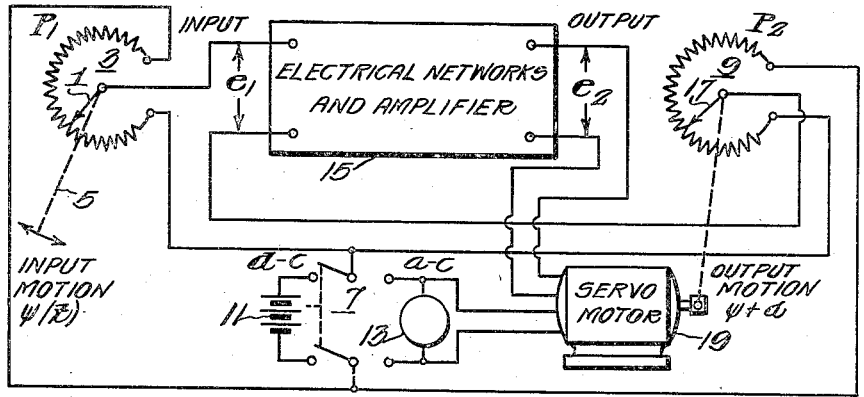
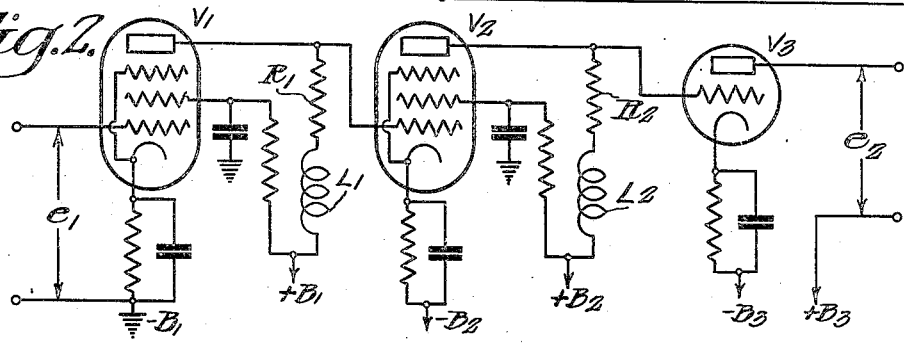
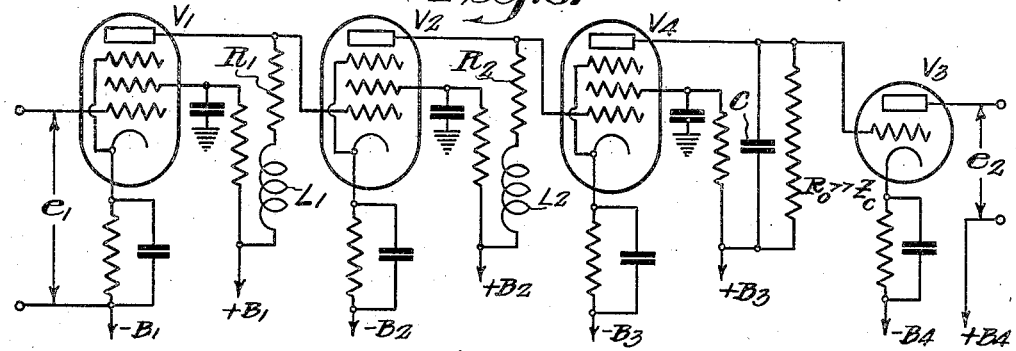
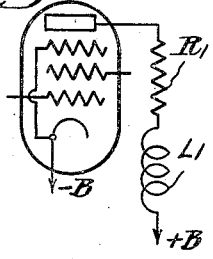 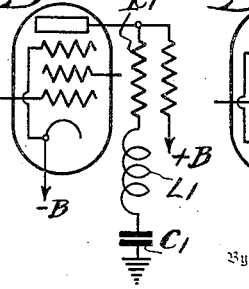 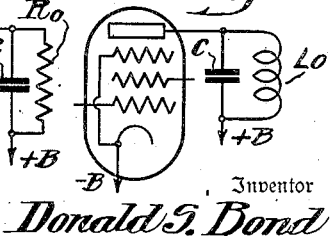 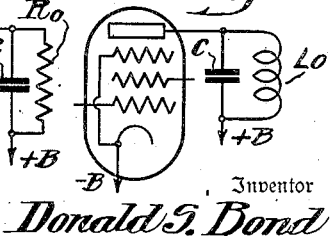
Inventor
Donald S. Bond
Attorney Patented July 23, 1940

2,208,623

UNITED STATES PATENT OFFICE 2,208,623

ELECTROMECHANICAL SERVO DEVICE

Donald S. Bond, Philadelphia, Pa., assignor to Radio Corporation of America, a corporation of Delaware Application March 31, 1939, Serial No. 265,265

9 Claims. (Cl. 172—239)

This invention relates to servo devices and more particularly to an apparatus of an electromechanical nature in which one element is moved synchronously with another element with minimum lag and with freedom from instability or "hunting."

It is often desired to indicate the position of a remotely located movable element by controlling electrically a nearby indicator. In devices of this type, some lag is inevitable and, unless suitable precautions are taken, instability and "hunting" are apt to be present.

One of the objects of this invention is the provision of means for indicating the position of an element by means of a second element actuated by a servo motor. Another object is in the provision of means for indicating the position of an element by means of a second element moved in synchronism with the first element. Another object is to provide means for indicating remotely the position of an object by means of a synchronously operated indicator with a minimum of lag. A further object is to provide means for repeating the movements of an element by means of an indicator operated synchronously without instability or hunting.

The invention will be described by referring to the accompanying drawing in which Figure 1 is a schematic diagram of one embodiment of the invention; Figures 2 and 3 are schematic diagrams of the networks and amplifiers used in the invention; and Figures 4a, 4b, 4c and 4d illustrate modifications of the network. In describing the several figures, similar reference numerals will be used to describe similar elements.

Referring to Fig. 1, the movable contact 1 of a potentiometer 3 is coupled mechanically by a shaft 5 or the like to an element which has a motion $\psi(t)$. The fixed terminals of the potentiometer are connected to a double-pole double-throw switch 7 and to the fixed terminals of a second potentiometer 9. The pairs of the fixed terminals of the switch 7 are connected respectively to a D.-C. source 11 and an A.-C. source 13. The movable contact of the potentiometer 3 is connected to one of the input terminals of an electrical network and amplifier 15. The other input terminal is connected to the movable contact 17 of the second potentiometer 9. The movable contact is coupled mechanically to the shaft of a servo motor 19. The servo motor is connected to the output terminals of the amplifier 15.

In the operation of the network, either a D.-C. or an A.-C. source may be used. If the latter is employed, it is desirable to connect a reference phase from the alternator 13 to the servo motor 19 to determine its direction of rotation. The operation with the D.-C. source will first be described. It will be observed that, for any position of the movable contact 1, a definite input voltage $e_1$ will be applied to the amplifier. This voltage $e_1$ is also dependent upon the movable contact 17 of the second potentiometer 9. The current applied to the servo motor also depends upon the input and output voltages of the amplifier. Furthermore, for each position of the movable contact 1, a voltage is developed which is soon opposed by a voltage of like amplitude derived as a function of the position of the movable contact 17. In brief, the system automatically seeks a balance and, in this condition, the angular position of the driven element 17 corresponds to the angular position of the driving element 5.

The complete circuit is a bridge network in which the input voltage is proportional to the difference in position of the movable contacts of the input and output potentiometers respectively. The voltages corresponding to such difference pass through the network and amplifier and actuate the motor which brings the movable contacts into positions in which the input voltages are balanced. If these movements are to be effected without hunting and without too much lag, the electrical and mechanical constants must be chosen as will be hereinafter explained.

It will be noted that, in the circuit of Fig. 2, the input is represented as $e_1$ and the output as $e_2$. The output of the first amplifier $V_1$ includes a resistor $R_1$ and an inductor $L_1$. The second amplifier $V_2$ has an output circuit including resistor $R_2$ and inductor $L_2$. If this circuit is used in the system of Fig. 1, and if the movable contact 1 moves with a constant angular velocity $\omega_1$, the lag angle $\alpha_1$ of the slidable contact 17 will equal $$\frac{R\omega_1}{Km}$$

where R is the mechanical damping constant of the motor, K is a constant and $m$ is proportional to $GR_1R_2$, where G is the amplifier gain. If hunting is to be prevented, the constants $L_1$, $L_2$, $R_1$, and $R_2$ must be chosen to satisfy the following equations:

$$L + K_1K_2GL_1L_2 > 0$$

$$R + K_1K_2GL_1L_2\left(\frac{R_1}{L_1} \frac{R_2}{L_2}\right) > 0$$

$$K_1K_2GR_1R_2 > 0$$

where L is the moment of inertia of the output system and $K_1$, $K_2$ are constants.

If the lag angle is to approach zero for an input movement of constant angular velocity $\omega_1$, the circuit of Fig. 3 may be used. The circuit of Fig. 3 corresponds to Fig. 2 as far as tubes $V_1$, $V_2$, and $V_3$ are concerned. The difference is found in the added tube $V_4$, whose output circuit includes a capacitor C shunted by a resistor $R_0$ satisfying the condition $R_0 >> Z_c$. The desired stable condition may be represented as $$(R+K_2q_1) > 0$$
$$(R+K_2q_1)n_1 - Lm_1 > 0$$
$$(K_2m_1) > 0$$

where R is the mechanical damping constant of the motor, $K_2$ is a constant, $q_1$ is $$\frac{G_1K_1L_1L_2}{C}$$

$n_1$ equals $$\frac{G_1K_1L_1L_2(A_1+A_2)}{C}$$

L is the moment of inertia of the driven system and $m_1$ equals $$\frac{G_1K_1L_1L_2A_1A_2}{C}$$

in which $A_1$ and $A_2$ are the damping factors of the circuits.

The foregoing circuits are used for direct current sources 11; if alternating currents are applied 13, two changes are desirable. The first modification is to apply a current of reference phase to an A.-C. operated servo motor thereby to determine the sense of rotation of the motor rotor. The second modification is shown in Fig. 4b or Fig. 4d. In the former figure, a capacitor $C_1$ is connected in series with inductor $L_1$ and the circuit $C_1L_1$ is tuned to resonance. The modified circuit is applied to tubes $V_1$ and $V_2$ of Fig. 2. The circuit of tube $V_4$ of Fig. 3 is modified by shunting an inductor $L_0$ across the capacitor C. The circuit $CL_0$ is tuned to resonance. For convenience, the D.-C. circuits Figs. 4a and 4c are shown so that they may be compared to Figs. 4b and 4d, respectively.

Thus, the invention has been described as a servo or follow-up mechanism which is operated by electro-mechanical means. The elecrical means forms a bridge which is balanced when there is no angular difference in position of the movable contacts of a pair of potentiometers. The movable contact of the input or first potentiometer is connected to the element whose movements are to be followed. The movable contact of the second potentiometer is connected to a servo motor which is connected to the output of the network and amplifier forming part of the bridge circuit. The network includes resistive and reactive elements which respond to fundamental, and first and second derivative terms expressing movements of the element whose movements are to be followed. It should be understood that any desired number of mathematical terms or differentiation circuits may be employed. Likewise the invention is not limited to following angular movements but may be used to reproduce or follow other forms of movement.

I claim as my invention:

1. In a device of the character described, a pair of potentiometers, means for coupling the movable contact of the first of said potentiometers to an element whose movements are to be followed, a servo motor, means coupling the shaft of said motor to the movable contact of the second of said potentiometers, a source of current, means for applying said current to said potentiometers, means for deriving opposing potentials from said potentiometers, an electrical network, said electrical network including a plurality of vacuum tubes for non-reactively coupling, a resistance and an impedance device responsive respectively to the steady state currents corresponding to the angular position of said first potentiometer movable contact and to the variable currents corresponding to the rate of change of position of said first potentiometer movable contact, to a second resistance and a second impedance responsive respectively to the currents corresponding to said angular position and said changing position and to currents corresponding to the first derivative of said rate of change of position, means for applying said opposing potentials to the input of said network, and means connecting said motor to the output of said network.

2. In a device of the character described, a pair of potentiometers, means for coupling the movable contact of the first of said potentiometers to an element whose movements are to be followed, a servo motor, means coupling the shaft of said motor to the movable contact of the second of said potentiometers, a source of alternating current, means for applying said alternating current to said potentiometers, means for deriving opposing potentials from said potentiometers, an amplifier including an electrical network, said amplifier including vacuum tubes for coupling non-reactively a first serially connected resistor and reactor to a second serially connected resistor and reactor so that said first serially connected resistor and reactor will be responsive respectively to the fundamental term and the first derivative of currents applied to said amplifier input and said second serially connected resistor and reactor will be responsive respectively to said fundamental and first derivative terms and to the second derivative term of currents applied to said amplifier input, means for applying said opposing potentials to the input of said amplifier, and means connecting said motor to the output of said amplifier.

3. In a device of the character of claim 2 in which the network includes a vacuum tube forming a non-reactive coupling for an inductor and a capacitor resonant to the frequency of said alternating current.

4. A follow-up mechanism including a movable element, a source of current, means for deriving from said source two currents, one of said currents being a function of the position of said element, the other of said currents being a function of the position of an element indicating the position of said movable element, an amplifier, said amplifier including thermionic tubes for coupling non-reactively serially connected reactive and non-reactive elements to succeeding serially connected reactive and non-reactive elements responsive respectively to the currents including a fundamental and a first derivative term and to currents including said fundamental, said first, and a second derivative term, means for applying said derived currents to the input of said amplifier in opposition, a servo motor connected to the output of said amplifier, and means coupling the armature of said motor to control the position of said second element, whereby said motor operates upon said second element until equal opposing currents are applied to said input.

5. A device of the character of claim 4 in which the amplifier includes resistive and reactive elements so related to each other and to the amplifier gain and to the damping of the motor that hunting is substantially prevented.

6. A device of the character of claim 4 in which the amplifier includes resistive and reactive elements so related to each other and to the amplifier gain and to the damping of the motor that hunting is substantially prevented, and the lag of said second element is minimized.

7. A device of the character of claim 2 in which a current of reference phase is obtained from said alternating current source and applied to said servo motor to determine the sense of its direction of rotation.

8. A follow-up mechanism including a variable element, a source of current, means for deriving from said source two currents, one of said currents being a function of said variable element, the other of said currents being a function of an element corresponding to said variable element, an amplifier, said amplifier including thermionic tubes for coupling non-reactively serially connected reactive and non-reactive elements to succeeding serially connected reactive and non-reactive elements responsive respectively to the currents including a fundamental and a first derivative term and to currents including said fundamental, said first, and a second derivative term, means for applying said derived currents to the input of said amplifier in opposition, a servo motor connected to the output of said amplifier, and means coupling the armature of said motor to control the position of said second element, whereby said motor operates upon said second element until equal opposing currents are applied to said input and the application of currents corresponding to said derivative terms prevents undue hunting of said motor.

9. A follow-up mechanism including an element, a source of current, means for varying said current as a function of the movements of said element so that said variation of current includes components corresponding to the movements of said element, and an amplifier for amplifying said varying currents, said amplifier including thermionic tubes for coupling non-reactively serially connected reactive and non-reactive elements to succeeding serially connected reactive and non-reactive elements responsive respectively to the currents including a fundamental and a first derivative term and to currents including said fundamental, said first, and a second derivative term.

DONALD S. BOND.